(12) United States Patent
Guazzotti et al.

(10) Patent No.: US 11,052,364 B2
(45) Date of Patent: Jul. 6, 2021

(54) ENHANCED EFFICIENCY ENDOTHERMIC REACTOR FOR SYNGAS PRODUCTION WITH FLEXIBLE HEAT RECOVERY TO MEET LOW EXPORT STEAM GENERATION

(71) Applicant: KT KINETICS TECHNOLOGY SPA, Rome (IT)

(72) Inventors: Cristina Guazzotti, Rome (IT); Emma Palo, Battipaglia (IT); Lorena Mosca, Rome (IT)

(73) Assignee: KT KINETICS TECHNOLOGY SPA, Rome (IT)

( * ) Notice: Subject to any disclaimer, the term of this patent is extended or adjusted under 35 U.S.C. 154(b) by 47 days.

(21) Appl. No.: 16/072,906

(22) PCT Filed: Feb. 8, 2016

(86) PCT No.: PCT/IT2016/000033
§ 371 (c)(1),
(2) Date: Jul. 26, 2018

(87) PCT Pub. No.: WO2017/138028
PCT Pub. Date: Aug. 17, 2017

(65) Prior Publication Data
US 2019/0039038 A1 Feb. 7, 2019

(51) Int. Cl.
*B01J 8/06* (2006.01)
*B01J 19/24* (2006.01)
(Continued)

(52) U.S. Cl.
CPC .......... *B01J 8/062* (2013.01); *B01J 19/2495* (2013.01); *B01J 19/30* (2013.01); *B01J 19/32* (2013.01);
(Continued)

(58) Field of Classification Search
CPC combination set(s) only.
See application file for complete search history.

(56) References Cited

U.S. PATENT DOCUMENTS 3,607,125 A * 9/1971 Kydd .................. B01J 8/008
422/625
3,909,299 A 9/1975 Corrigan
(Continued)

FOREIGN PATENT DOCUMENTS

CN 1564708 * 1/2005
CN 101233075 * 7/2008
(Continued)

OTHER PUBLICATIONS

International Search Report, dated Nov. 3, 2016, from corresponding PCT/IT2016/000033 application.
(Continued)

*Primary Examiner* — Kaity V Chandler
(74) *Attorney, Agent, or Firm* — Nixon & Vanderhye

(57) ABSTRACT

An apparatus for carrying out endothermic reactions including a plurality of catalytic vessels, immersed in a combustion chamber having a contiguous overlaid convection chamber enclosing a top portion of the catalytic vessels wherein heat is recovered at a lower temperature level from the flue gases from the combustion chamber. The catalytic vessels may contain internal and coaxial heat recovery tubes creating an annular space filled in with a catalytic device. Both the external heat recovery through the catalyst tube outer surface and the internal heat recovery through the inner tube surface can be maximized by an enhanced catalytic device acting also as a heat transfer promoter in the process gas region. The apparatus provides enhanced and flexible heat recovery that permits to meet the request of minimum or none export steam production in one single
(Continued)

apparatus, avoiding the need of a pre-reforming section and/or of a convective reformer downstream.

13 Claims, 7 Drawing Sheets

(51) Int. Cl.
  B01J 19/30 (2006.01)
  B01J 19/32 (2006.01)
(52) U.S. Cl.
  CPC ............ *B01J 2208/0053* (2013.01); *B01J 2208/00221* (2013.01); *B01J 2208/00504* (2013.01); *B01J 2208/00938* (2013.01); *B01J 2219/00038* (2013.01); *B01J 2219/00157* (2013.01); *B01J 2219/00159* (2013.01); *B01J 2219/3085* (2013.01); *B01J 2219/30261* (2013.01); *B01J 2219/30408* (2013.01); *B01J 2219/30475* (2013.01); *B01J 2219/32279* (2013.01); *B01J 2219/32286* (2013.01); *B01J 2219/32408* (2013.01); *B01J 2219/32466* (2013.01)

(56) References Cited

U.S. PATENT DOCUMENTS

| | | | | |
|---|---|---|---|---|
| 4,504,447 A * | 3/1985 | Spurrier | ............... | B01J 8/02 422/202 |
| 4,959,079 A * | 9/1990 | Grotz | ............... | B01J 8/062 252/373 |
| 4,985,230 A | 1/1991 | Baden | | |
| 5,429,809 A | 7/1995 | Stahl | | |
| 5,935,531 A | 8/1999 | Giacobbe | | |
| 6,472,092 B1 * | 10/2002 | Matsuda | ............... | B01J 19/26 429/425 |
| 6,680,044 B1 * | 1/2004 | Tonkovich | ............... | H01M 8/0612 423/652 |
| 6,793,700 B2 | 9/2004 | Pham et al. | | |
| 7,504,048 B2 * | 3/2009 | Licht | ............... | B01J 8/062 252/373 |
| 2002/0002794 A1 * | 1/2002 | Figueroa | ............... | B01J 23/755 48/197 R |
| 2002/0013225 A1 * | 1/2002 | Figueroa | ............... | B01J 37/0225 502/302 |
| 2002/0018739 A1 * | 2/2002 | Johnston | ............... | B01J 8/0438 422/198 |
| 2002/0021992 A1 * | 2/2002 | Bass | ............... | B01J 8/0221 48/61 |
| 2003/0064011 A1 * | 4/2003 | Burlingame | ............... | C01B 3/382 422/198 |
| 2003/0131533 A1 | 7/2003 | Pham | | |
| 2004/0123523 A1 * | 7/2004 | Rong | ............... | B01J 8/0453 48/200 |
| 2006/0172161 A1 * | 8/2006 | Ueda | ............... | H01M 8/0618 429/411 |
| 2012/0277327 A1 * | 11/2012 | Han | ............... | B01J 8/067 518/702 |
| 2013/0323162 A1 * | 12/2013 | De Groot | ............... | C01B 3/38 423/651 |

FOREIGN PATENT DOCUMENTS

| EP | 1 329 256 A1 | 7/2003 |
|---|---|---|
| FR | 2 374 946 A1 | 7/1978 |

OTHER PUBLICATIONS

Written Opinion, from corresponding PCT/IT2016/000033 application.

* cited by examiner

Sec. B-B

Sec. A-A

Sec. E-E

Sec. D-D

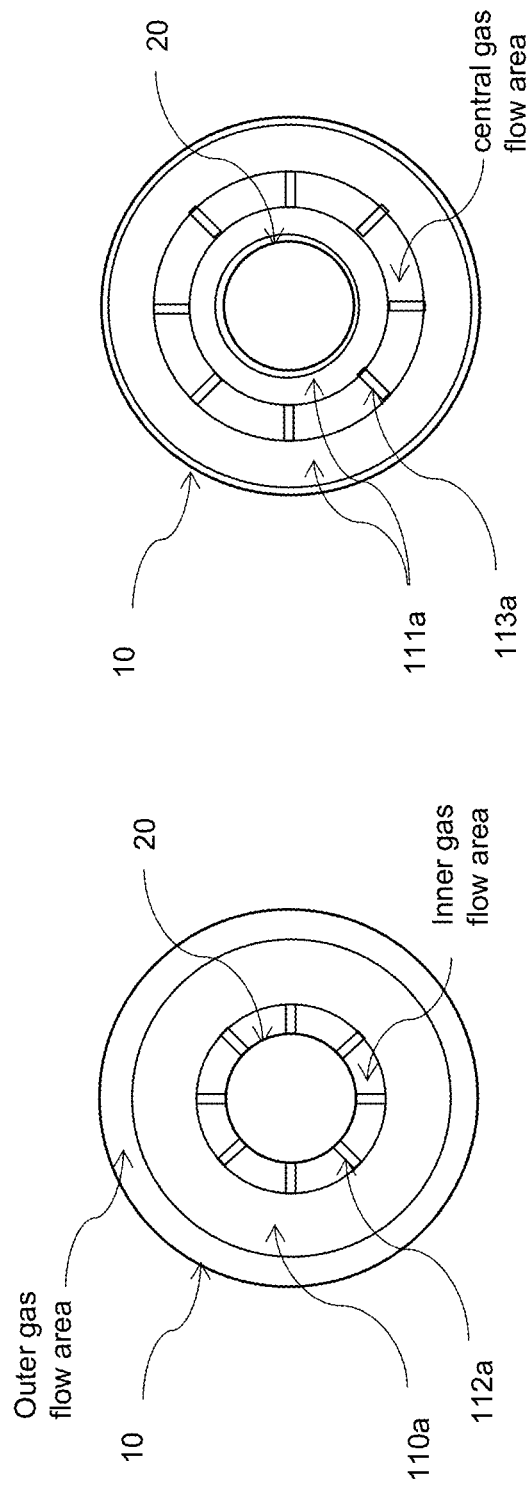

ENHANCED EFFICIENCY ENDOTHERMIC REACTOR FOR SYNGAS PRODUCTION WITH FLEXIBLE HEAT RECOVERY TO MEET LOW EXPORT STEAM GENERATION

FIELD OF THE INVENTION

The present invention relates to the endothermic processes such as, but not limited to, the steam reforming process and the CO2 reforming process starting from fossil hydrocarbons feeds, from biogas feeds, or oxygenates feeds like bio-alcohols, for the production of a synthesis gas having an H2:CO ratio suitable for the desired downstream process (hydrogen, ammonia, methanol, GTL, etc. . . . ).

More specifically the present invention relates to the main endothermic reaction step of such processes and it is aimed to provide a flexible solution to match the overall process heat balance with the minimum fuel consumption, CO2 production and heat rejection to the atmosphere.

BACKGROUND OF THE INVENTION

It is well known to prepare a synthesis gas (which mainly consists of hydrogen and carbon monoxide and in addition carbon dioxide, nitrogen, unconverted hydrocarbons and steam) by means of endothermic steam reforming of an hydrocarbon feed in an apparatus consisting of catalyst vessels immersed in a radiant box where heat is exchanged between flue gas and the product gas in order to recover heat which is required to maintain an adequate reaction temperature. It is also known that the fuel necessary to meet the heat duty of the endothermic reactions can be reduced by adoption of an internal process-to-process heat recovery and by flue gas heat recovery by convection.

PRIOR ART

The above described heat recovery, both from process gas and flue gas, is known in the prior ART in a number of different apparatus.

U.S. Pat. No. 5,935,531 filed on Oct. 26, 1994 describes a catalytic reactor having a plurality of tubular catalytic vessels in which an ascending pipe arranged coaxially is provided for each one, so that the ascending pipe forms an annular space housing the catalytic material. In this patent anyway each tubular catalytic vessel is enclosed, at least in a part, by a coaxial heat distributor that shields the catalytic tubes from direct radiation. In this apparatus the presence of coaxial heat distributors surrounding each catalytic vessel limits the direct heat exchange by radiation between the fuel gas from combustion zone and the heat sink constituted by the catalyst tubes surface, and this fact results in a higher heat transfer surface required to transfer the reaction duty.

U.S. Pat. No. 5,429,809 filed on Feb. 22, 1994 presents a tubular heat exchange reactor constituted by a plurality of bayonet tubes reactors, each provided with an external and coaxial perforated sleeve realizing a conduit for the progressive supply of the hot flue gas in contact with the catalytic tubes. Also in this case the heat supply is limited by the sleeve, acting as a heat distributor and in fact limiting the direct heat exchange by radiation.

One main issue of the so called 'bayonet tubes' configuration adopted both in U.S. Pat. No. 5,935,531 and in U.S. Pat. No. 5,429,809, is that the inner and outer tubes are exposed to different temperature ranges and consequently present a differential thermal expansion. In the presence of a conventional catalyst bed made of pellets (typically cylindrical shape with holes are used) loaded inside the annular volume the differential tube movements are hindered by friction between catalyst particles and tube walls, and by the pellets tendency to get stuck in the annular region and transmit the crush strength from the outer to the inner tube, especially during the cooling down phases. This phenomenon has two negative consequences: a) the rupture of the catalyst pellets, causing the formation of fine particles and dusts depositing on the bottom bed portion, with consequent increase of the pressure drops and risk of catalyst particles sintering; b) the mechanical stress accumulation on the joint between the inner and outer tube. Both aspects tend to worsen with time and, after a number of shut-down and start-up cycles, can lead to an undesired shut down due to high pressure drops over catalyst bed or even to a mechanical failure due to stress accumulation.

In both U.S. Pat. Nos. 5,935,531 and 5,429,809 the heat input to the endothermic reactions occurring inside the catalytic vessels is ensured by means of heat distributors devices that are in view of the flames (in U.S. Pat. No. 5,935,531) or in direct contact with the very high temperature flue gas generated by adiabatic combustion (in U.S. Pat. No. 5,429,809); these metal devices are necessarily made by high grade alloys materials, adding cost and complexity to the design, and constituting week components subject to possible mechanical failure with consequent reduction of the equipment reliability.

U.S. Pat. No. 6,793,700 filed on Jan. 14, 2002 presents a heat recovery configuration from both process gas and flue gas outside combustion chamber, at least for what concerns a portion of the catalytic vessels (bottom), but this peculiar geometry limits the internal heat recovery to that portion of the catalytic tubes and, due to the configuration adopted, leads to the necessity to split the process gas feed into two feed streams directed to the top and bottom inlets, resulting in a duplication of the inlet manifolds and of the feed control.

One main purpose of extending heat recovery from process gas and combustion flue gases is that the heat in excess generated from combustion is very limited or null, minimizing or deleting the export steam generation, which is not always a desired by-product in a syngas process.

Aim of the Invention

The present invention presents solutions to the above stated problems by means of innovative catalytic devices and heat input regulation, while maintaining single inlet of the feed gas.

Specific scope of the present invention is also to meet a limited export steam requirement, either null or limited to 10% steam credit of the overall energy consumption (LHV) for syngas production; thanks to a flexible inner heat recovery this specific scope is met in one single apparatus, without the need of installing a pre-reforming section or a heat exchange reformer downstream. Said scope is realized by means of two different embodiments of the same apparatus in which the catalytic vessels realize different levels of heat recovery from inner process gas and outer flue gas.

Object of the Invention

It is a first object of the invention an apparatus suitable for conducting endothermic reaction comprising:
  a combustion chamber having a closed bottom end, an open top end, two opposite end walls, and two opposite side walls a convection chamber, adjacent to the combustion chamber and located in correspondence of the top opening window, allowing the flow of flue gas through a plurality of convection channels in flow communication with a top plenum chamber connected to an outlet flue gas channel;

a plurality of catalytic vessels arranged at a distance and disposed in line or staggered along the common centerline of the combustion and convection chamber in such a way that the bottom portion is immersed in the combustion chamber and the remaining top portion is immersed in convection chamber and is provided with an extended surface (longitudinal fins or studs);

a plurality of burners disposed in parallel lines along the side walls of the combustion chamber on two or more firing levels, each line provided with differentiated firing capacity or fuel capacity control.

It is further object of the present invention an above indicated apparatus wherein each catalytic vessel has:

an open top and a closed bottom end and include an inner heat transfer tube with both ends open, mechanically joined on the top end and free to move axially inside the catalytic vessel (first embodiment), wherein the annular space delimited by the catalytic vessel and the inner heat transfer tubes is filled with an enhanced catalytic device;

or an open top and bottom end allowing the process gas flow once through (second embodiment), wherein the inner cylindrical volume is filled with an enhanced catalytic device;

It is a further object of the present invention an above indicated apparatus wherein the enhanced catalytic device is conceived as follows:

It is realized starting from elements of a mechanical support characterized by a random open cell structure having high void fraction (>75%), a good thermal conductivity (at least 5 W/m° K @RT) and enabling the gas flow both in axial and radial direction; the starting material for the preparation of the open cells structure may be of ceramic nature belonging to the silicon carbide family (ex.: SiC, Si/SiC, optionally mixed with alumina) or of metallic nature belonging to the heat resistant alloys (ex.: Ni—Cr—Fe, Ni—Cr—Fe—Mo, Ni—Cr—Al, Ni—Fe—Cr—Al, etc.); the 'open cell structure' may be realized also starting from metal wire or strip randomly wrapped to form an irregular metal skein; the catalytic active species are added via a catalytic layer deposited on top. Each catalyst element is formed in a suitable shape, annular for the first embodiment, cylindrical for the second embodiment, so as to be stacked one over the other to fill in the inner reactor volume of each catalytic vessel, that is an annular space for the first embodiment or a cylindrical space in the second embodiment; the single catalyst element can have different heights, depending on the height obtained from the manufacturing procedure of the starting open cell structure. Acceptable heights are in the range of 10 mm to 500 mm. The inner and outer diameters of the annular elements and the diameter of the cylindrical element are selected with suitable tolerance to fit in the catalytic vessels and permit loading and unloading operations.

Catalyst elements are separated by 'flow deviators' interposed between the above characterized elements, performing the function to give a radial component to the process gas flow from the catalyst centerline to the heat transfer surfaces and then back toward the catalyst centerline; such a gas flow pattern results in a relevant increase of the heat transfer rate through the catalyst bed, due to an increase of the average gas velocity, which is consequent to a reduction of the axial cross section area and due to a parallel heat transfer associated with the mass flow of the process gas in radial direction.

It is another object of the present invention an above described apparatus wherein the annular space delimited by the catalytic vessel and the inner heat transfer tubes (in a first embodiment) or the space within the 'once through' catalyst vessels (in a second embodiment) is filled with a metal foil structured type catalyst in which the metal foils are arranged so as to obtain a similar and relevant increase of the heat transfer rate without a parallel increase of the pressure drops, and avoid the transmission of the crush strength between outer and inner walls of the catalytic vessels.

DESCRIPTION OF THE INVENTION

The apparatus object of the present invention realizes an enhanced and flexible heat recovery from the flue gases generated in the combustion chamber and from the syngas produced inside the catalytic vessels.

The hot flue gases are generated by combustion of a conventional or bio fuel stream in a side fired radiant chamber, in direct contact with at least a bottom portion of the catalytic vessels and exchange heat with the process sink reacting inside the catalytic vessels mainly by a radiative heat transfer mechanism. The radiant chamber is overlaid by a convective chamber having a reduced section area flue gas side, wherein heat from flue gases to process gas is transmitted mainly by convective mechanism.

Such a flexible heat recovery is realized by means of two different embodiments of the same apparatus. Heat recovery from the flue gases is performed through the outer surface of the catalytic vessels in both embodiments (see FIG. 1,2), throughout a convective chamber surrounding a top portion of the catalytic vessels wherein the outer surface is equipped with an extended surface (either fins or studs). An additional heat recovery from the product syngas may be realized by means of an inner tube (in the first embodiment) located inside each catalyst vessel, wherein the hot syngas flows upward in counter-current with the reacting gas in the annular zone. In such a way the endothermic reactions are sustained by the product gas for a significant portion of the heat duty (10%÷30%).

The two different embodiments are specifically designed to obtain a maximum fuel efficiency (>70%) and zero export steam production (first embodiment), or else a lower fuel efficiency (60-70%) with limited export steam production (second embodiment), in any case a fuel efficiency considerably higher compared to side fired or top fired radiant furnace.

The presence of an extended surface (either studs or longitudinal fins) permits a flexible heat recovery from flue gas through a proper selection of the extension ratio, so as to meet a specific export steam requirement resulting from overall process heat balance.

In both embodiments the heat distribution along the endothermic process in the radiant chamber is realized by means of two or more firing levels, each one having specific firing capacity or regulated by firing control, with the burners symmetrically located along the side walls at an adequate distance from the tubes to avoid flame impingement; in this way the heat firing (LHV) can be released according to the required reaction heat absorption pattern. The gradual heat release along the catalytic vessels involves that no heat distributor is needed around the same vessels, resulting in a less complex and more reliable design and in the same time obtaining the desired and controlled heat flux profile, also limiting the maximum catalyst tube wall temperature.

The use of a new and enhanced catalytic device has the main purpose to avoid the issues related to the presence of the catalyst pellets in the annular process gas region of the first embodiment and in the same time it obtains an increase of the overall heat transfer coefficient through the outer and inner heat transfer surface, with the additional benefit of reducing the maximum tube skin temperatures.

The presence of an enhanced catalytic device improves the process performance and reliability also in the 'once through' configuration of the catalytic vessels in the second embodiment, since in this case it avoids the formation of fine catalyst particles and dusts that can accumulate on the bottom leading with time to high pressure drops, and also in this case it increases the heat transfer coefficient with consequent decrease of the maximum skin temperatures.

The here proposed invention, as above outlined, realizes, through two different embodiments, a flexible and enhanced heat recovery, permitting to balance the request of export steam in one single equipment, without the need of installing a pre-reforming section and/or a convective reformer downstream the main reformer, in such a way that it overcomes specific issues of the prior art technology and represents a step ahead toward a more efficient, simple and reliable process.

The apparatus according to the invention will be elucidated hereinafter with the use of figures in which various preferred embodiments have been incorporated without having the intent of limiting the invention to those particular embodiments as depicted in the figures.

BRIEF DESCRIPTION OF THE DRAWINGS

In the drawings:

FIGS. 5a and 5b represent the details of two consecutive flow deviators of the first embodiment according to FIGS. 1 and 4a;

DETAILED DESCRIPTION OF THE INVENTION

With reference to the drawings above illustrated, the apparatus object of the present invention consists of a plurality of catalytic vessels 10 immersed in a combustion chamber 100 equipped with burners 101. A top portion of the catalytic vessels may be immersed in a contiguous and overlaid convective chamber 200 in flow communication with the combustion chamber 100.

Figure 1:
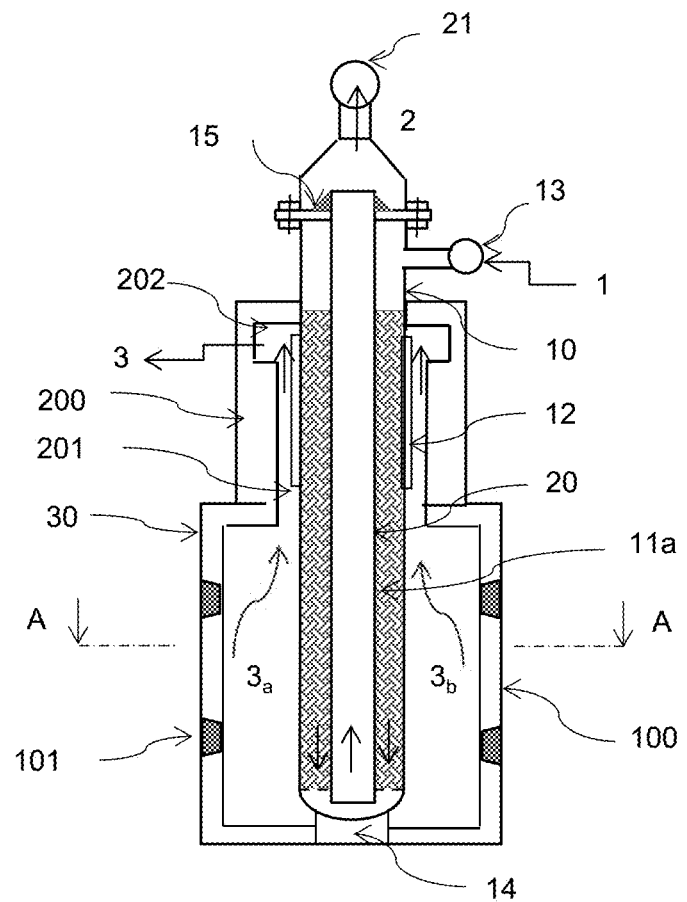
FIG. 1 represents a vertical section of a endothermic reactor according to first embodiment of the present invention where the catalytic vessels are disposed along the common center plane of the combustion and convective chambers; each catalytic vessel contains one inner concentric tube originating an annular space filled with an enhanced catalytic device.
Figure 2:
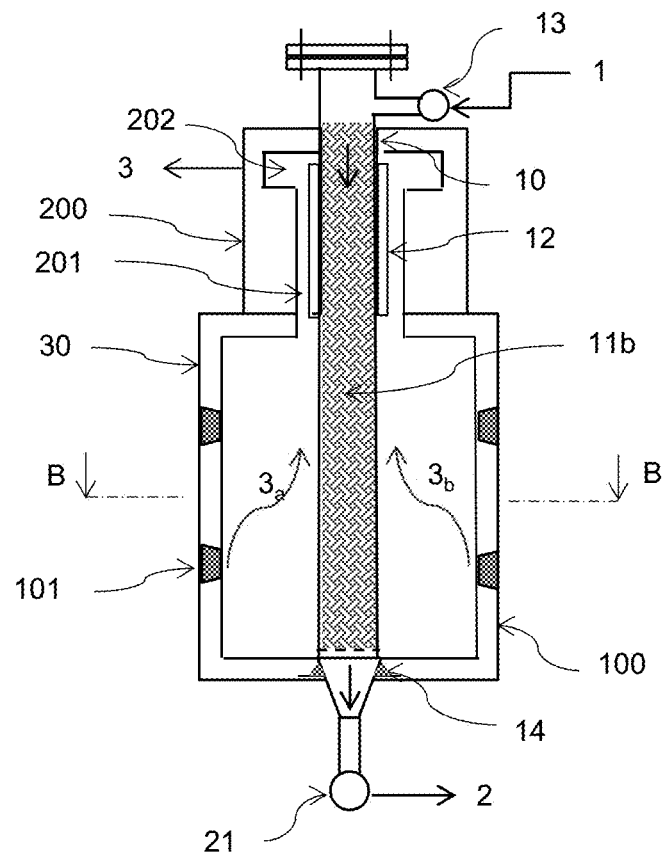
FIG. 2 represents a vertical section of an endothermic reactor according to second embodiment of the invention wherein the catalytic vessels are open on both top and bottom ends and do not contain an inner heat transfer tube.
Figure 3B:
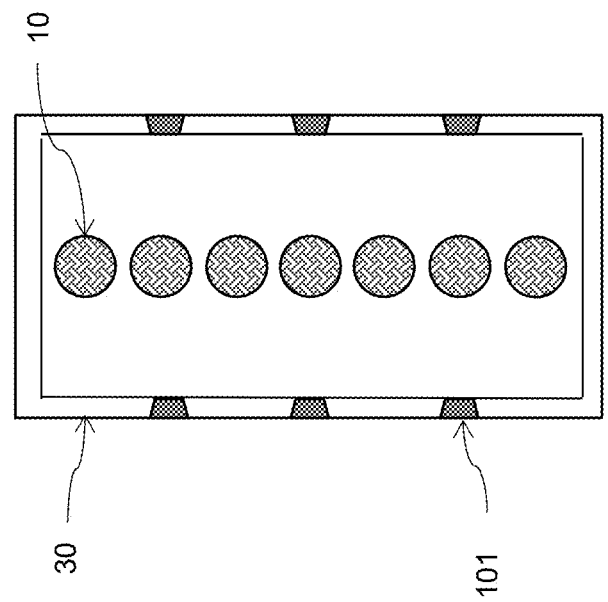
FIGS. 3a and 3b represents the horizontal sections of the two embodiments of FIGS. 1 and 2.
Figure 3A:
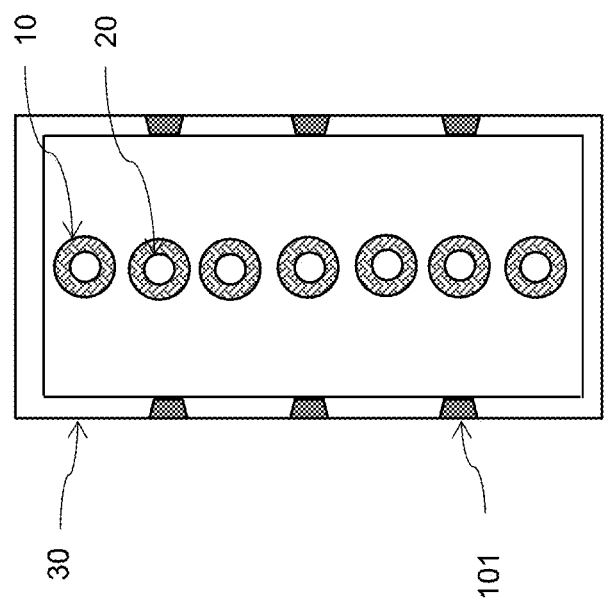

The catalytic vessels 10 are disposed along the common center plane of the combustion and convective chambers, at an equal distance from each other and may be disposed either in line (preferred) or staggered on a triangular pitch (first embodiment in FIG. 1 and second embodiment in FIG. 2). The combustion chamber 100, incorporating the bottom portion of the catalytic vessels, is dedicated to the production of hot flue gases by air combustion through burners 101 located on the side walls in view of the tubes and at a suitable distance to avoid any flame impingement. It should be noted that in both embodiments the design excludes the use of any other burner configuration than the 'side fired'. The presence of an upper convection chamber of substantial length requires in fact a larger flue gas pressure drop than what would be necessary with a conventional reformer having only a radiant section. As a result, a 'top fired' burner, which is another conventional burner design, would lead to a significant distortion of the flame leading to flame impingement on the tubes and potentially entry of the flame into the convection section which is undesirable. On the other end, the use of 'bottom fired' burners would not allow to distribute the heat input to the catalytic vessels as necessary, while the use (here selected) of two or more levels of side fired burners, each provided with different firing capacities, or having firing capacity control per level, can ensure to follow any desired heat release pattern, realizing a combustion controlled 'by zone' of any type of available fuel gas (purge gas from downstream syngas purification process, natural gas, refinery fuel gas, bio gas, etc. . . . ). The heat generated by combustion (LHV) is thus released at the different firing levels according to a selected firing pattern, in such a way that the heat absorption by the endothermic reaction in each firing zone follows a desired heat flux profile and that an acceptable maximum tube skin temperature is not exceeded.

| From bottom upward | Firing LHV | % heat from flue as | Hflux avg. Kcal/hr/m2 | Tmax skin (tube OD) |
|---|---|---|---|---|
| Zone 1 RAD | ≈40% | ≈22% | ≈55000 | ≈950° C. |
| Zone 2 RAD | ≈60% | ≈42% | ≈95000 | ≈910° C. |
| Zone 3 CONV | None | ≈36% | ≈65000 | ≈890° C. |

In both embodiments the upper side of the refractory housing 200 is conceived as a convection chamber, wherein the hot flue gases 3a and 3b generated in the combustion chamber 100 are allowed to flow upwards, in countercurrent with the process gas flow inside the catalytic vessels, through tight refractory ducts 201 realized by means of pre-shaped refractory materials surrounding the catalytic vessels 10; the top portion of the catalytic vessels 10 is provided with an extended surface 12 (either longitudinal fins or studs) that allows to match the desired convective heat recovery from flue gas. In the top end of the convection chamber 200 the flue gas ducts 201 surrounding each catalytic vessel are connected with a common plenum chamber 202 wherein the flue gas streams flowing upward in each refractory duct 201 are collected in the common chamber 202 and flow orthogonally to the tubes axis toward a common end 3.

The hot flue gases generated, 3a and 3b, in the combustion chamber 100 and flowing through the convective channels 201 to the top exit 3 exchange their heat content through the outer surface of the catalytic tubes 20, flowing in Countercurrent with the reacting gas inside the tubes. In the tube portion immersed in the combustion chamber 100 the prevailing heat transfer mechanism by flue gas is radiation, while in the portion immersed in the convection chamber 200 the prevailing heat transfer mechanism is convection. The exposed tube length of the bottom portion is in the range of 50% to 75% of the overall exposed tube length, and it is selected in order to limit the flue gas temperature at inlet of the convection channels 201 at a level compatible with the extended surface material (like 25Cr-20Ni SS).

In the first embodiment (FIG. 1) each catalytic vessel is closed at one end (bottom) and contains one inner concentric tube 20 originating an annular space, wherein this annular space is filled with an enhanced catalytic device 11a performing the catalytic function and contemporarily acting as a heat transfer promoter. The process gas feed 1 is distributed to the top end of the catalytic vessels 10 through an inner manifold 13 and flows downward through the annular volume filled with the enhanced catalytic device 11a where the endothermic reactions occur; at the bottom end of the catalyst vessel the reacted gas 2 inverts its direction and flows upwardly inside the heat transfer tube 20 while exchanging heat with the reacting process gas in the annular volume; in correspondence of the top outlets 2 the syngas leaves the catalyst vessels and it is collected through the outlet manifold 21 toward the downstream process. The inner tube is mechanically joined to the outer tube by means of a welded plate 15 inserted between the top flanges and thus it is fully supported at the top. The inner tube is shorter than the outer tube in order to provide a gap between the open bottom end of the inner tube and the closed bottom end of tube 10 so as to allow the gas flow from the outer to the inner tube section. The weight of each catalytic vessel is in part supported through bottom supports 14 and in part sustained through external counterweights on top, allowing the tubes thermal expansion on top.

In the second embodiment the catalytic vessels are open on both top and bottom end, and do not contain the inner heat transfer tube 20. In this simplified embodiment the process syngas 1 flow only downward (once through) inside the catalytic vessels through the enhanced catalytic device 11b from the top to the bottom end, in countercurrent with flue gas flowing upward. The reacting process gas flowing through the catalytic device 11b leaves the catalyst vessels from the bottom end and it is collected through the outlet manifold 21. The weight of the catalytic vessels is in part supported through bottom supports 14 and in part sustained through external counterweights located externally on top, allowing the tubes thermal expansion upward.

Figure 4B:
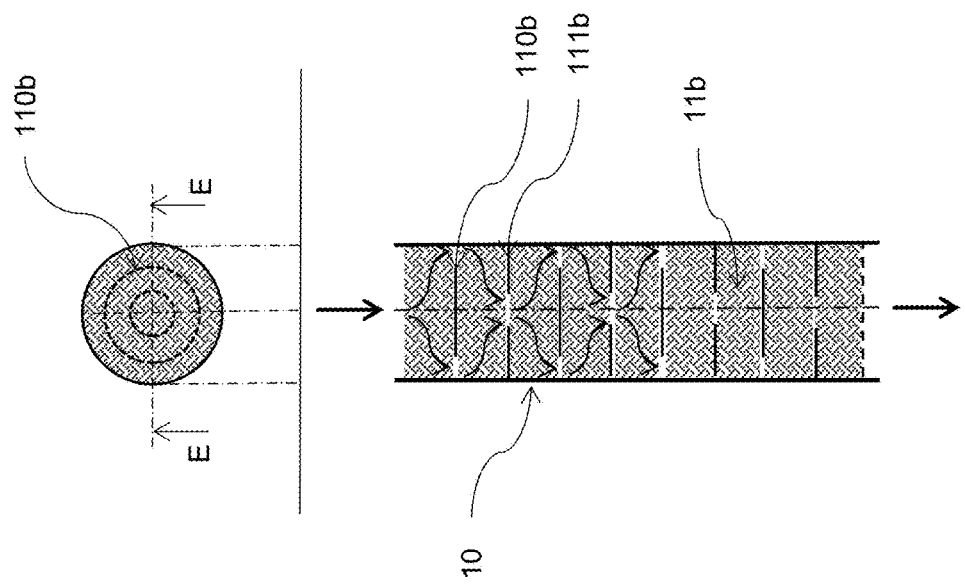
FIGS. 4a and 4b represent in vertical and horizontal sections two different configurations of the enhanced catalytic device installed in the catalytic vessels according to first and second embodiments of the invention.
Figure 4A:
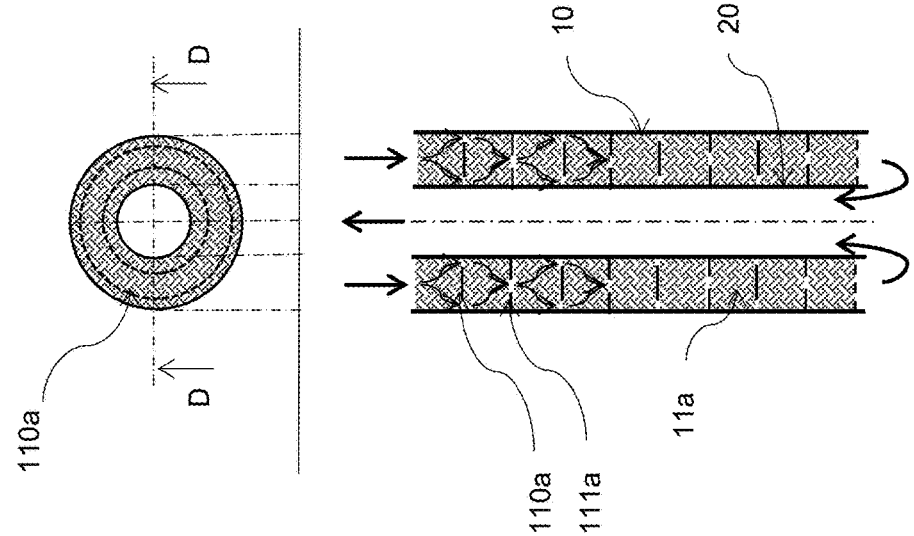
Figure 6:
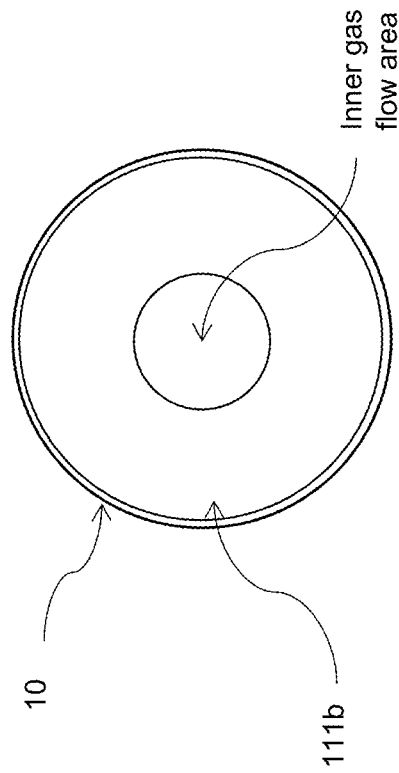
FIGS. 6a and 6b represent the details of two consecutive flow deviators of the second embodiment according to FIGS. 2 and 4b.
Figure 6:
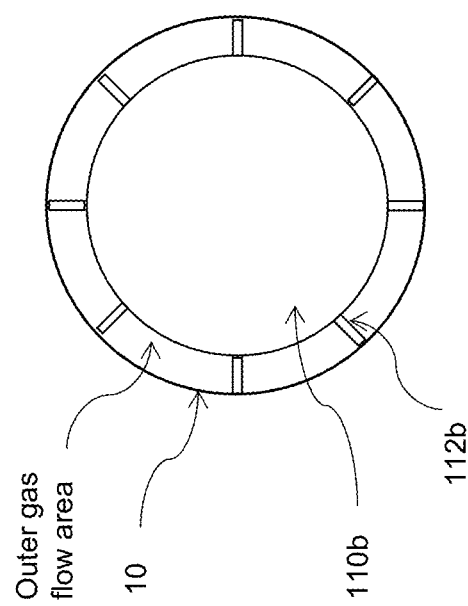

The enhanced catalytic device installed in the catalytic vessels may have two possible configurations (11a and 11b in FIGS. 4a and 4b) suitably developed for the catalytic vessels of the first embodiment and of the second embodiment.

The new and enhanced catalytic device is realized starting from a mechanical support characterized by a random open cell structure having high void fraction (>75%), a good thermal conductivity (at least 5 W/m° K RT) and enabling the gas flow both in axial and radial direction; like for example the ceramic open cells foams prepared from high conductivity materials (ex.: silicon carbide or a combination of alumina and SiC), or else the metal foams or metal skein prepared starting from heat resistant metal alloys suitably selected for the high temperatures and reducing syngas atmospheres (like for ex. Ni—Cr—Fe, Ni—Cr—Fe—Mo, Ni—Cr—Al, Ni—Fe—Cr—Al alloys, etc.). Open cells ceramic foams, metal foams or wire meshes are suitable mechanical supports for the deposition of the catalytic material for the endothermic process; the catalyst active species are selected from transition metals (single component or combination of more metals). In order to obtain the best heat transfer vs pressure drops and catalytic performance, the mechanical support must be characterized by: high void fraction, high thermal conductivity, high adhesion capacity, high ratio surface area/volume.

According to the present invention the catalyst mechanical support is shaped in annular elements (for the first embodiment, catalytic device 11a) or in cylindrical elements (for the second embodiment, catalytic device 11b), to be stacked one over the other inside the catalytic vessels, after deposition of the catalyst active species; flow deviators (110a and 111a for the first embodiment in FIGS. 6a and 6b, 110b and 111b for the second embodiment in FIGS. 7a and 7b) are interposed between the catalyst elements, performing the function to direct the process gas flow according to a desired flow pattern. In both embodiments the flow deviators are realized from metal sheets having suitable thickness to sustain the weight of the catalytic device stacked on top and realized from high grades alloy materials resistant to high temperatures and syngas atmospheres (like for ex. Inconel or Incoloy alloys). In the first embodiment the flow deviators are shaped as repeated couples of rings having configurations 110a and 111a (see FIGS. 5a and 5b); the first is provided with radial centering beams 112a, the second with radial connecting beams 113a.

The outer diameter of the second flow deviator 111b, which is in correspondence to the catalytic tube 10 ID, and the inner diameter in correspondence to the heat transfer tube 20 OD, have suitable tolerances to permit their insertion and removal for catalyst loading and changeover.

The first deviator encountered 110a splits the gas into two streams, one flowing toward the external surface of the inner tube 10 and the other flowing toward the inner surface of the catalyst vessel 20. The inner and outer free section areas are selected in such a way that the heat amount to be transferred from the flue gas and from the process gas (ex.: 80% flue gas and 20% process gas) is transmitted from the inner surface of the catalyst vessel 10 and from the outer surface of the inner tube 10 (CFD modelling is necessary to perform heat transfer and pressure drops calculations according to the flow regime established by the described geometry). The second flow deviator 111a is made of two rings, connected by radial beams 113a, leaving an annular free central section area allowing the axial gas flow downward.

Figure 7:
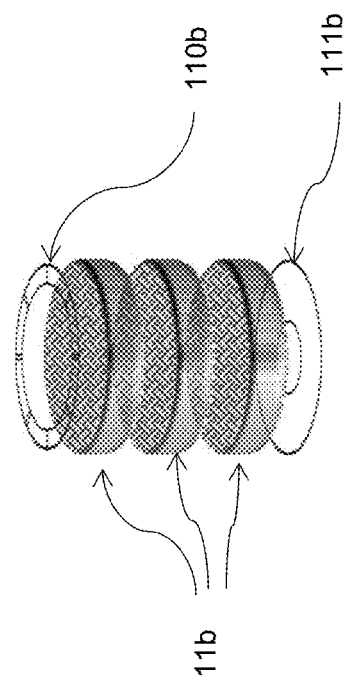
FIGS. 7a and 7b represent one possible configuration of stacking catalyst elements and flow deviators respectively in the first embodiment of FIG. 4a and in the second embodiment of FIG. 4b.
Figure 7:
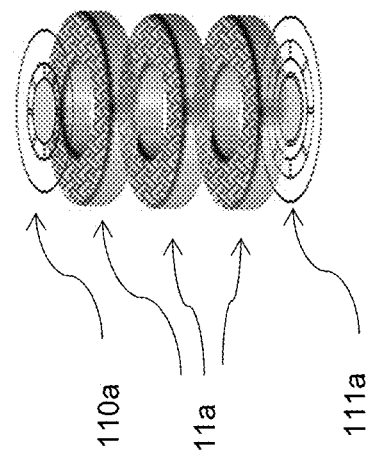

The outer and inner section area of the first flow deviator 110a and the central free section area of the flow deviator 111a, together with the overall number of flow deviators inside one catalyst vessel, are design parameters to be optimized by means of fluid dynamic modelling so as to obtain the maximum heat transfer rate versus selected pressure drops allowable, once the tube diameters 10 and 20 have been selected. Suitable range of the free flow section areas are 20%÷66% of the overall annular flow area, while the height between two consecutive flow deviators can vary from 100 to 500 mm. Depending on the height of the single catalyst element, optimized in consideration of the manufacturing procedure, the space between two consecutive flow deviators may be filled in with one or more catalyst elements, as shown in FIGS. 7a and 7b.

The overall configuration of the enhanced catalytic device as here above described, has the advantage to deviate the process gas flow in radial direction toward the inner surface of the catalyst tubes 10 and toward the outer surface of the inner tube 20, with consequent impingement of both tube walls and increase of the heat transfer coefficient up to 150% of the average value when the section area is reduced by 30%. In the same time, due to the very high porosity of the support elements (void fraction >75%), the pressure drops do not increase and instead there is an allowance for an increase of the mass flowrate per tube (≈30%) that can equal the allowable pressure drops of a conventional catalyst pellets bed.

The same flow deviators pattern is repeated up to the bottom outlet grid, where the process syngas inverts its flow upward within inner tube.

In a similar way for the second embodiment two consecutive flow deviators 110b and 111b (see FIGS. 6a and 6b) are shaped as alternative couples of concentric discs and doughnuts that can deviate the process gas flow once in radial direction toward the inner surface of the tube wall 10, and then backwards to the reactor axis.

The same flow deviators pattern is repeated up to the bottom outlet grid, where the process syngas leaves the catalytic vessel.

The here presented geometries of the catalytic device, comprising the catalyst elements and of the flow deviators, are only indicative and any other combination that can ensure a radial component of the process gas flow (as for example a first ring near the outer tube 10 and a second ring near the inner tube 20) may be considered as a valid alternative.

The use of the above described "enhanced catalytic device" can be eventually substituted with alternative catalytic devices having similar characteristics and performance, like for example the structured catalysts realized by means of metal foils arranged in such a way to realize wall jet impingements (ex.: U.S. Pat. No. 4,985,230).

The presence of an "enhanced catalytic device" as above described, or else of a metal foil structured type catalyst both acting as heat transfer promoter has the advantage that the outer tube and inner tube in the first embodiment can thermally expand independently without exerting mechanical stress and that no dust and small catalyst particles are produced by catalyst pellets rupture.

The invention claimed is:

1. An apparatus for conducting endothermic reactions able to meet the heat balance with a null or limited amount of export steam, through a flexible heat recovery, comprising:
a combustion chamber having a closed bottom end, an open top end, two opposite end walls, and two opposite side walls;
an upper convection chamber, in communication with said combustion chamber through said open top end, allowing the flow of flue gas through a plurality of convection channels in flow communication with a top plenum chamber connected to an outlet flue gas channel;
a plurality of catalytic vessels arranged at a distance and disposed in line or staggered along a centerline of the combustion and convection chamber in such a way that a bottom portion is immersed in the combustion chamber and a remaining top portion is immersed in the convection chamber wherein the portion of the catalytic vessel immersed in the combustion chamber is such that the flue gas temperature at its exit and inlet of the convection chamber is below the allowable limit temperature of the extended surface material;
wherein each catalytic vessel comprises an open top end and a closed bottom end, and an inner heat transfer tube with both ends open, wherein an annular space is delimited by the catalytic vessel and the inner heat transfer tube, and the annular space is filled with a plurality of discrete annular enhanced catalytic devices carrying a catalytic active species and stacked within the annular space, wherein said plurality of discrete annular enhanced catalytic devices are configured to be a heat transfer promoter and to avoid the transmission of a mechanical stress between the catalytic vessel and the inner heat transfer tube;
a plurality of annular flow deviators, with one flow deviator from the plurality interposed between each two stacked discrete annular enhanced catalytic devices,
wherein the plurality of flow deviators comprise a first sheet and a second sheet having a different shape than the first sheet, wherein the first and the second sheets are interposed between the catalytic devices in alternating couples, so as to obtain a radial component of the gas flow through the stack of catalytic devices, the radial flow alternating from radially outward to radially inward in each alternating stacked catalytic device, and so as to increase the average gas velocity through the catalytic devices, and wherein the flow deviators are made from high alloys materials;
a plurality of side fired burners disposed in parallel lines along the side walls of the combustion chamber on two or more firing levels, said burners being configured for a specific firing capacity and each configured to be regulated with firing control, wherein the specific firing capacity and regulated firing control is configured to be adequate to realize an assigned firing pattern,
and each further configured to distribute the heat required by the endothermic process without exceeding the allowable tube skin temperatures of the plurality of catalytic vessels, and without the need for a heat distributor metal device between the plurality of burners and the catalytic vessels;
wherein there is no heat distributor metal device between the plurality of burners and the catalytic vessels.

2. The apparatus of claim 1 in which the remaining top portion of the catalytic vessels immersed in the convection chamber is provided with an extended surface made of longitudinal fins or studs having a variable extension ratio to achieve the selected level of heat recovery from the flue gas.

3. The apparatus described in claim 2, wherein the enhanced catalytic device is realized starting from elements of a mechanical support having a random open cell structure and having high void fraction (>75%) and a good thermal conductivity (at least 5 W/m° K @RT)), and wherein the enhanced catalytic device is configured for gas flow both in axial and radial direction; the starting material for the preparation of open cells structure being of ceramic nature belonging to the silicon carbide family, or of metallic nature belonging to the heat resistant alloys; the open cell structure being realized also starting from metal wire or strip randomly wrapped to form an irregular metal skein; catalytic active species being added via a catalytic layer deposited on top; catalyst elements being formed in a suitable shape, so as to be stacked one over the other to fill in the inner reactor volume of each catalytic vessel; the height of each single catalyst element depending on the height obtained from the manufacturing procedure of the starting open cell structure.

4. The apparatus according to claim 3 in which the catalyst active species are selected from transition metals and can be a combination of two or more metals.

5. The apparatus according to claim 3 in which the catalyst active species are chemically supported on oxidic compounds.

6. The apparatus of claim 2 configured such that it is necessary to perform additional heat recovery from process syngas to meet the heat balance, and wherein the inner heat transfer tube is mechanically joined on the top end and free to move axially inside the catalytic vessel.

7. The apparatus described in claim 1, wherein the plurality of discrete annular enhanced catalytic devices start from elements of a mechanical support and have a random open cell structure having high void fraction (>75%) and a good thermal conductivity (at least W/m° K @RT), and wherein the enhanced catalytic devices are configured for gas flow both in axial and radial direction; the starting material for the preparation of open cell structure being of ceramic nature belonging to the silicon carbide family, or of metallic nature belonging to the heat resistant alloys; the open cell structure being realized also starting from metal wire or strip randomly wrapped to form an irregular metal skein; the catalytic active species being added via a catalytic layer deposited on top; the catalyst devices being formed in a suitable shape, so as to be stacked one over the other to fill in the inner reactor volume of each catalytic vessel; the height of each single catalyst device within the plurality depending on the height obtained from the manufacturing procedure of the starting open cell structure.

8. The apparatus according to claim 7 in which the catalytic devices are shaped as annular or cylindrical elements to be stacked one over the other in the catalytic vessels.

9. The apparatus according to claim 7 in which the catalyst active species are selected from transition metals and can be a combination of two or more metals.

10. The apparatus according to claim 7 in which the catalyst active species are chemically supported on oxidic compounds.

11. The apparatus according to claim 7 in which the catalyst active species are deposited on the mechanical support in the form of a thin layer.

12. The apparatus described in claim 1, configured such that it is necessary to perform additional heat recovery from process syngas to meet the heat balance, and wherein the inner heat transfer tube is mechanically joined on the top end and free to move axially inside the catalytic vessel.

13. The apparatus according to claim 1 wherein the annular space delimited by the catalytic vessel and the inner heat transfer tubes is filled with a metal foil structured type catalyst acting as a heat transfer promoter and avoiding the transmission of a mechanical stress between the catalytic vessels and the inner heat recovery tubes.

* * * * *